United States Patent [19]

Mayo

[11] 3,959,768

[45] May 25, 1976

[54] DUAL DIRECTION INDICATOR

[75] Inventor: E. Raymond Mayo, Anaheim, Calif.

[73] Assignee: Walter K. Hurtt, Anaheim, Calif. ; a part interest

[22] Filed: Aug. 2, 1974

[21] Appl. No.: 494,218

[52] U.S. Cl. .................................. 340/82; 340/109

[51] Int. Cl.[2] ....................... G08G 1/00; B60Q 1/26

[58] Field of Search ..................... 340/82, 109, 331; 317/137, 139

[56] References Cited

UNITED STATES PATENTS

| | | | |
|---|---|---|---|
| 3,041,579 | 6/1962 | Kanzenback | 340/82 |
| 3,479,641 | 11/1969 | Summers | 340/82 |
| 3,622,980 | 11/1971 | Elledge, Jr. | 340/82 |
| 3,747,063 | 7/1973 | Hudson, Jr. | 340/109 |

*Primary Examiner*—Donald J. Yusko
*Attorney, Agent, or Firm*—Philip M. Hinderstein

[57] ABSTRACT

A dual direction indicator including a plurality of lights arranged in opposed arrowhead configurations and an arrow shaft common to both arrowheads. In one mode of operation, the lights forming the arrow shaft and then the lights forming one of the arrowheads are sequentially energized to indicate one of two opposed directions. In a second mode of operation, the lights forming the arrow shaft remain energized and the lights forming the two arrowheads are alternately energized to indicate both opposed directions. The above is achieved in a simple, efficient, and inexpensive manner utilizing a plurality of relays and switches, a flasher, and a sequential motor switch.

7 Claims, 1 Drawing Figure

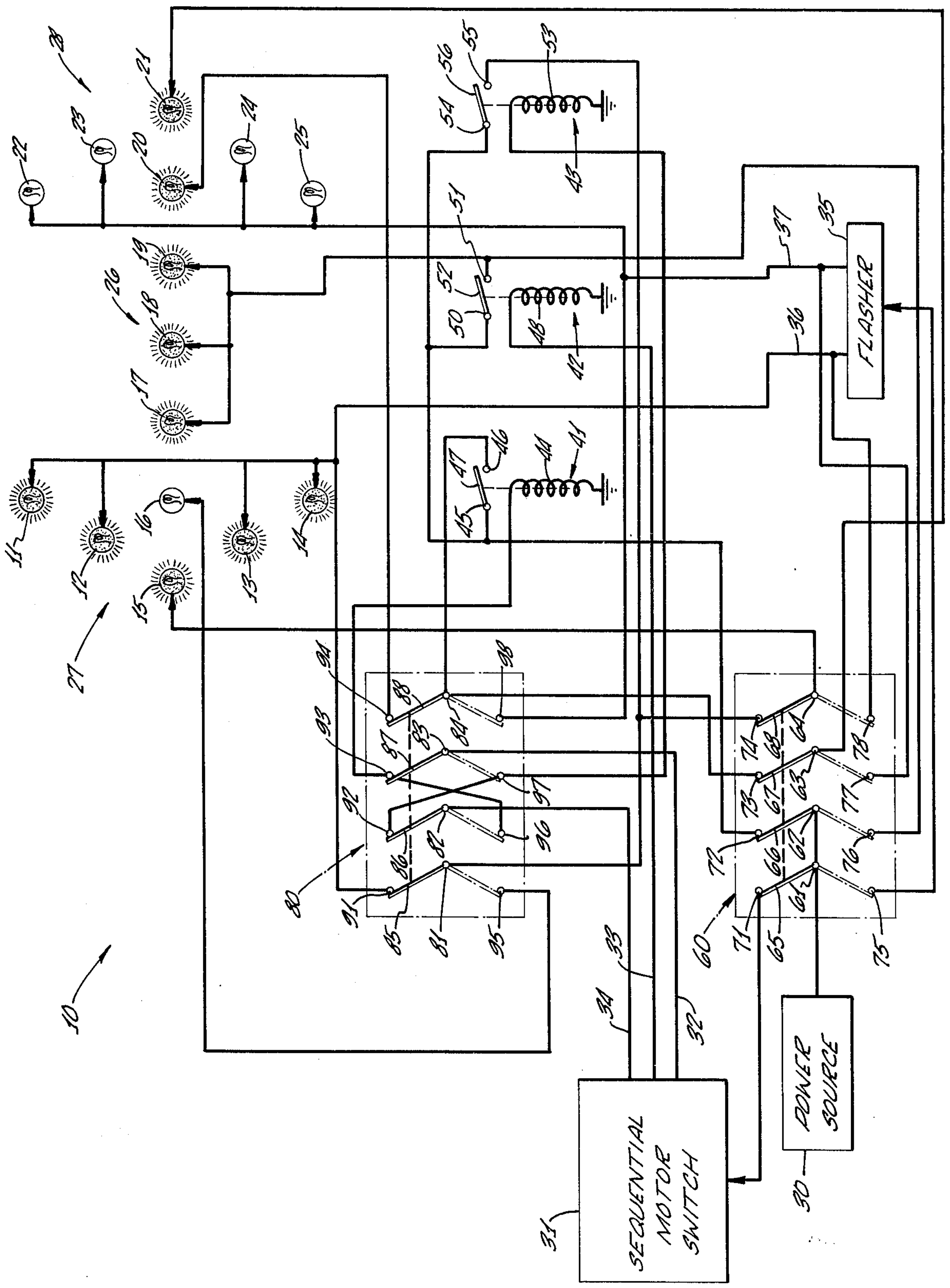
FLASHER
POWER SOURCE
SEQUENTIAL MOTOR SWITCH

DUAL DIRECTION INDICATOR

BACKGROUND OF THE INVENTION

1. Field of the Invention.

The present invention relates to a dual direction indicator and, more particularly, to a dual direction indicator for selectively indicating one or both of two opposed directions.

2. Description of the Prior Art.

There are many applications where it is necesssary to convey a message of anticipated direction change or to signal others to change directions. In road construction and repair, a direction change is often required in the form of a detour around the construction or repair area. For this purpose, a commonly used detour sign is the type constructed from reflectorized materials which are illuminated by auto headlights or the like. However, wih present high speed travel on modern freeways, reflectorized signs may not provide adequate warning time.

One system for providing adequate warning in advance of a detour is to illuminate a direction arrow which will be visible beyond the headlight distance. Unfortunately, driving hypnosis often leads to a state of semiconsciousness and the continuously illuminated sign may be overlooked.

To overcome these problems, arrays of flashing lamps and sequentially energized signs have been developed heretofore. In some such systems, a plurality of lamps arranged in opposed arrowhead configurations and an arrow shaft common to both arrowheads is sequentially energized to indicate the desired direction. An example of this type of system is that disclosed and claimed in U.S. Pat. No. 3,479,641 issued Nov. 18, 1969, to Gerald C. Summers for Sequential Direction Indicator. Other systems are disclosed in U.S. Pat. Nos. 3,622,980 and 3,747,063 issued Nov. 23, 1971, and July 17, 1973, respectively, for Directional Warning System and Bistable Circuit Controlled Sequential Lamp Indicator, respectively.

Unfortunately, while the systems of the above patents are effective in providing the desired warning for oncoming vehicles, the circuitry for energizing the lights is elaborate and complex and the resulting systems are therefore expensive. Because of such expense, many State agencies are reluctant to purchase such systems and they have not gained the widespread acceptance that circumstances would appear to dictate.

SUMMARY OF THE INVENTION

According to the present invention, these problems are solved by providing a simple, efficient and inexpensive dual direction indicator. The present indicator uses three relays, a sequential motor switch, a conventional flasher, and two four-pole, double-throw switches. The present system is capable of indicating either one or both of two opposed directions. Thus, the present system may be sold at a price rendering it pratical for widespread use.

Briefly, the present dual direction indicator comprises a plurality of lights arranged in opposed arrowhead configurations and an arrow shaft common to both arrowheads; a plurality of relays, each having a pair of normally open contacts and a moveable arm; a power source; first switch means for sequentially energizing a plurality of first output lines; second switch means for alternately energizing a pair of second output lines; third switch means for selectively energizing either the first switch means or the second switch means, the third switch means being operative, when the first switch means is energized, to conduct power to one of the contacts of each of the relays; fourth switch means for interconnecting the first output lines with the relays to activate same to close the normally open contacts, the fourth switch means permitting energization of the relays in one of two opposing sequences; means for connecting the other of the contacts of each of said relays to the lights so as to sequentially energize the arrow shaft and then one of the arrowheads, depending on the position of the fourth switch means, to indicate one of two opposed directions, the third switch means being operative, when the second switch means is energized, to energize the lights associated with the arrow shaft; and means for interconnecting the second output lines with the lights associated with the arrowheads, to alternately indicate both of the two opposed directions when the second switch means is energized.

OBJECTS

It is therefore an object of the present invention to provide a novel dual direction indicator.

It is a further object of the present invention to provide a simple, efficient and inexpensive dual direction indicator.

It is a still further object of the present invention to provide a dual direction indicator for selectively indicating one or both of two opposed directions.

It is another object of the present invention to provide a dual direction indicator including three relays, a motor switch, a flasher, and two four-pole, double-throw switches.

Still other objects, features, and attendant advantages of the present invention will become apparent to those skilled in the art from a reading of the following detaild description of the preferred embodiment constructed in accordance therewith, taken in conjunction with the accompanying drawing wherein:

BRIEF DESCRIPTION OF THE DRAWINGS

The sole FIGURE is a schematic circuit diagram of a dual direction indicator constructed in accordance with teachings of the present invention.

DESCRIPTION OF THE PREFERRED EMBODIMENT

Referring now to the drawings, the present dual direction indicator, generally designated 10, includes a plurality of lights 11-25 arranged in opposed arrowhead configurations and an arrow shaft common to both arrowheads. More specifically, lights 15–21 are arranged in a row and define a common arrow shaft 26. Lights 11–14 join with light 15 to form a first arrowhead 27 and light 21 joins with lights 11–25 to define a second arrowhead 28.

Dual direction indicator 10 further comprises a power source 30 which may, most simply, be a 12 volt battery of the type commonly found in an automobile or truck on which indicator 10 would be mounted or conveyed. Dual direction indicator 10 also includes a switch 31 which is preferably a sequential motor switch for sequentially energizing a plurality of output lines 32, 33 and 34. Switches of this type are well known in the art and preferably each output line remains energized until all output lines are energized whereupon all three output lines are de-energized to repeat the cycle.

Dual direction indicator 10 further includes a flasher 35 of known configuration which when energized alternately energizes a pair of output lines 36 and 37.

Dual direction indicator 10 also includes a plurality of relays 41, 42, and 43, relay 41 including a winding 44, a pair of normally open contacts 45 and 46 and a moveable arm 47 for closing contacts 45 and 46. In like manner, relay 42 includes a winding 48, contacts 50 and 51 and an arm 52 and relay 43 includes a winding 53, contacts 54 and 55 and an arm 56.

Finally, dual direction indicator 10 includes a pair of four-pole double-throw switches 60 and 80. Switch 60 includes four central terminals 61–64 connected to the stationary ends of arms 65–68, respectively, which are interconnected for simultaneous movement. In one position of arms 65–68, the moveable ends thereof contact terminals 71–74 whereas in the other position thereof they contact terminals 75–78, respectively.

Switch 80, on the other hand, includes terminals 81–84 connected to the stationary ends of moveable arms 85–88 which are interconnected for simultaneous movement. In one position of arms 85–88, the moveable ends thereof contact terminals 91–94, respectively, and in the other position thereof contact terminals 95–98, respectively.

Lights 11–25, power source 30, switch 31, flasher 35, relays 41–43 and switches 60 and 80 are interconnected as follows. The output of power source 30 is connected to terminals 61 and 62 of swich 60. Terminal 71 of switch 60 is connected to the input of switch 31 whereas terminal 75 of switch 60 is connected to the input of flasher 35. In this manner, either switch 31 or flasher 35 is energized, depending upon the position of arms 65–68 of switch 60.

Terminal 72 of switch 60 is connected to contacts 45, 50 and 54 of relays 41–43, respectively, terminal 73 of switch 60 is connected to terminal 84 of switch 80, and terminal 74 of switch 60 is connected to terminal 81 of switch 80 and also to terminal 55 of relay 43. Terminals 77 and 78 of switch 60 are connected to output lines 37 and 36, respectively, of flasher 35 whereas terminal 76 of switch 60 is connected to terminal 51 of relay 42 and to lights 17, 18, and 19 of arrow shaft 26.

Output lines 32, 33 and 34 of motor switch 31 are connected to terminal 83 of switch 80, winding 48 of relay 42 and terminal 82 of switch 80, respectively. Output line 36 of flasher 35 is connected to terminal 91 of switch 80 and also to lights 11–14 of arrowhead 27. Output line 37 of flasher 35 is connected to terminal 98 of switch 80 and to lights 22–25 of arrowhead 28.

Terminal 92 of switch 80 is connected to terminal 97 thereof, the latter also being connected to winding 53 of relay 43. Terminal 96 of switch 80 is connected to terminal 93 thereof, the latter being connected to winding 44 of relay 41. Terminal 84 of switch 80 is connected to contact 46 of relay 41.

Terminal 64 of switch 60 is connected to light 15, terminal 95 of switch 80 is connected to light 16, terminal 94 of switch 80 is connected to light 20 and terminal 63 of switch 60 is connected to light 21.

OPERATION

In operation, switch 60 determines which of the two modes of dual direction indicator 10 is to be activated. With arms 65–68 in contact with the terminals 71–74, respectively, sequential motor switch 31 is activated to sequentially energize arrow shaft 26 and then one of arrowheads 27 or 28, to indicate one of two opposed directions, depending upon the position of arms 85–88 of switch 80. On the other hand, with arms 65–68 of switch 60 in contact with terminals 75–78, respectively, switch 31 is deactivated and flasher 35 is activated whereupon lights 17–19 are energized and flasher 35 alternately energizes lights 11–15 and lights 21–25.

More specifically, assume first that arms 65–68 of switch 60 are in contact with terminals 71-74 and that arms 85–88 of switch 80 are in contact with terminals 91–94, respectively. The power from source 30 is conducted via terminals 61 and 71 and arm 65 to switch 31 and also via terminals 62 and 72 and arm 66 to contacts 45, 50 and 54 of relays 41–43, respectively. During the operation of switch 31, output line 32 is energized first. This supplies the power from source 30 to terminal 83 where it is conducted via arm 87 and terminal 93 to winding 44 of relay 41 to activate same and bring arm 47 into contact with terminal 46. The power from source 30 is therefore conducted via contacts 45 and 46 and arm 47 to terminal 84 where such power is conducted via arm 88 and terminal 94 to light 20 and via terminal 73, arm 67 and terminal 63 to light 21. Therefore, lights 20 and 21 light up. Next, switch 31 activates line 33 energizing coil 48 of relay 42 and bringing arm 52 into contact with contact 51. Thus, the power at contact 50 from source 30 is conducted via arm 52 and contact 51 to lights 17–19 to energize same. Thus, in two distinct steps, two different portions of arrow shaft 26 are energized. Thereafter, switch 31 energizes output line 34 conducting the power from source 30 to terminal 82 of switch 80 where it is conducted via arm 86 and terminals 92 and 97 to winding 53 of relay 43 to bring arm 56 into contact with contact 55. Thus, the power from source 30, at contact 54, is conducted via arm 56 and contact 55 to terminals 81 and 74 of switches 80 and 60, respectively. Terminal 81 of switch 80 is connected via arm 85 and terminal 91 to lights 11–14 to energize same whereas terminal 74 of switch 60 is connected via arm 68 and terminal 64 to light 15 to energize same. Therefore, arrowhead 27 is next energized. It will be also apparent to those skilled in the art that light 15 must be isolated from lights 11–14 so that it may be independently energized as part of arrow shaft 26 when arrowhead 28 is to be energized. Thus, after the two portions of arrow shaft 26 are energized, arrowhead 27 is energized to indicate one direction. Switch 31 thereafter de-energizes relays 41–43 and the procedure repeats.

Assuming now that arms 85–88 of switch 80 are moved into contact with terminals 95–98, respectively, without moving arms 65–68 of switch 60. As can be readily determined from an inspection of the drawings, output lines 32, 33 and 34, in this case, sequentially energize relays 43, 42 and 41. When relay 43 is energized, the power from source 30 at contact 54 is conducted via arm 56 and contact 55 to terminals 81 and 74 of switches 80 and 60, respectively, the power at terminal 81 being conducted via arm 85 and terminal 95 to energize light 16 and the power at terminal 74 being conducted via arm 68 and terminal 64 to energize light 15. When relay 42 is energized, the power at contact 50 is conducted via arm 52 and contact 51 to lights 17–19 so that two separate portions of arrow shaft 26 are sequentially energized. Finally, when relay 41 is energized, the power at contact 45 is conducted via arm 47 and contact 46 to terminals 84 and 73 of switches 80 and 60, respectively, the power at terminal 84 being conducted via arm 88 and terminal 98 to energize lights 22–25 and the power at terminal 73 being conducted via arm 67 and terminal 63 to energize light 21. Thus, after the two portions of arrow shaft 26 are energized, arrowhead 28 is energized to indicate an alternate direction. Switch 31 thereafter de-energizes relays 41–43 and the procedure repeats.

Assume now that arms 65–68 of switch 60 are moved into contact with terminals 75–78, respectively. In such case, power is removed from switch 31 so that relays 41–43 are no longer energized. On the other hand, power from source 30 is applied via terminal 61, arm 65 and terminal 75 to the input of flasher 35. Power is also conducted from source 30 to terminal 62 and then via arm 66 and terminal 76 directly to lights 17–19 to energize same.

Flasher 35 is now operative to alternately energize output lines 36 and 37. When output line 36 is energized, lights 11–14 are directly energized. Power is also conducted from output line 36 to terminal 78 of switch 60 and then via arm 68 and terminal 64 to light 15 thereby energizing arrowhead 27.

Output line 37, on the other hand, is connected directly to lights 22–25 and also to terminal 77 of switch 60. Power from terminal 77 is then conducted via arm 67 and terminal 63 to light 21, completing the energization of arrowhead 28.

It can therefore be seen that according to the present invention, there is provided a simple, efficient and inexpensive dual direction indicator 10. Indicator 10 uses three relays 41–43, a sequential motor switch 31, a flasher 35, and two four-pole, double-throw switches 60 and 80. Indicator 10 is capable of indicating either one or both of two opposed directions, depending upon the position of switches 60 and 80. Thus, indicator 10 may be sold at a price rendering it practical for widespread use.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A dual direction indicator comprising:
- a plurality of lights arranged in opposed arrowhead configurations and an arrow shaft common to both arrowheads;
- a plurality of relays, each having a pair of normally open contacts;
- a source of energizing signal;
- means for conducting said energizing signal to one of said contacts of each of said relays;
- first swich means for sequentially energizing a plurality of output lines;
- second switch means for interconnecting said output lines wih said relays to activate same to close said normally open contacts, said second switch means permitting activation of said relays in one of two opposing sequences; and
- means including said second switch means and said energizing signal conducting means for connecting the other of said contacts of each of said relays to said lights so as to sequentially energize said arrow shaft and then one of said arrowheads, depending on the position of said second switch means, to indicate one of two opposed directions.

2. A dual direction indicator according to claim 1 comprising three relays and wherein the first activated relay energizes a portion of said arrow shaft, farthest from said one arrowhead, wherein the second activated relay energizes a second portion of said arrow shaft, closest to said one arrowhead, and wherein the third activated relay energizes said one arrowhead.

3. A dual direction indicator according to Claim 1 further comprising:
- third switch means for alternately energizing a pair of output lines; and
- means for interconnecting said third switch means output lines with said arrowheads to alternately energize same;
- and wherein said means for conducting said energizing signal to said relays comprises:
- fourth switch means interposed between said energizing signal source, said first switch means and said third switch means for selectively energizing either said first switch means or said third switch means, said fourth switch means being further operative, when energizing said third switch means, to energize said lights defining said arrow shaft.

4. A dual direction indicator comprising:
- a plurality of lights arranged in opposed arrowhead configurations and an arrow shaft common to both arrowheads;
- three relays, each having a pair of normally open contacts;
- a power source;
- first switch means for sequentially energizing three first output lines;
- second switch means for alternately energizing a pair of second output lines.
- third switch means having first and second positions and being interposed between said power source and said first and second switch means for selectively energizing either said first switch means, when in said first position, or said second switch means, when in said second position, said third switch means being operative, when in said first position, to interconnect said power source and one of the contacts of each of said relays and being operative, when in said second position, to interconnect said power source and at least some of said lights forming said arrow shaft;
- fourth switch means having first and second positions for interconnecting said first output lines with said relays to sequentially activate same to close said normally open contacts, said fourth switch means permitting activation of said relays in one of two opposing sequences depending upon the position thereof;
- means for connecting the other of said contacts of each of said relays to said lights so as to energize the lights forming said arrow shaft, in two steps, and then said lights forming one of said arrowheads, depending on the position of said fourth switch means, to indicate one of two opposed directions; and
- means for interconnecting said second output lines with the lights forming said arrowheads so as to alternately energize the lights forming said arrowheads to indicate both of said two opposed directions.

5. A dual direction indicator according to claim 4 wherein said first switch means is a sequential motor switch.

6. A dual direction indicator according to claim 5 wherein said second switch means is a flasher.

7. A dual direction indicator according to claim 4 wherein the first activated relay energizes a portion of said arrow shaft, farthest from said one arrowhead, wherein the second activated relay energizes a portion of said arrow shaft, closest to said one arrowhead, and wherein the third activated relay energizes said one arrowhead.

* * * * *